(12) United States Patent
Nakazawa

(10) Patent No.: US 6,643,778 B1
(45) Date of Patent: Nov. 4, 2003

(54) NETWORK SYSTEM USING A FIREWALL DYNAMIC CONTROL METHOD

(75) Inventor: Osamu Nakazawa, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/280,453

(22) Filed: Mar. 30, 1999

(30) Foreign Application Priority Data

Oct. 23, 1998 (JP) ............................................. 10-302715

(51) Int. Cl.[7] .......................... H04L 9/00; G06F 15/173
(52) U.S. Cl. ........................................ 713/201; 709/223
(58) Field of Search ................................. 713/200, 201; 709/203, 223, 225–228, 230

(56) References Cited

U.S. PATENT DOCUMENTS

| | | | | |
|---|---|---|---|---|
| 5,590,199 A | * | 12/1996 | Krajewski, Jr. et al. | 380/25 |
| 5,974,444 A | * | 10/1999 | Konrad | 709/203 |
| 6,098,172 A | * | 8/2000 | Coss et al. | 713/201 |
| 6,104,716 A | * | 8/2000 | Crichton et al. | 370/401 |
| 6,112,228 A | * | 8/2000 | Earl et al. | 709/205 |
| 6,173,322 B1 | * | 1/2001 | Hu | 709/224 |
| 6,178,505 B1 | * | 1/2001 | Schneider et al. | 713/168 |
| 6,212,565 B1 | * | 4/2001 | Gupta | 709/229 |
| 6,330,605 B1 | * | 12/2001 | Christensen et al. | 709/226 |
| 6,385,661 B1 | * | 5/2002 | Guthrie et al. | 709/316 |
| 6,408,336 B1 | * | 6/2002 | Schneider et al. | 709/229 |
| 6,446,109 B2 | * | 9/2002 | Gupta | 709/203 |
| 2001/0014881 A1 | * | 8/2001 | Drummond et al. | 705/43 |

OTHER PUBLICATIONS

Jeffrey et al, "Proxy–Sharing Proxy Servers" 1996, IEEE, p. 116–119.*

Nolle, "Making Bandwidth 'Free'", Apr. 26, 1999, Network World, vol. 16, #17, dialog text search, p. 1–3.*

Hokimoto et al, "An Approach for Constructing Mobile Applications Using Service Proxies" 1996, IEEE Proceedings of the 16th ICDCS, p. 726–733.*

Nakajima et al, "Adaptive Continous Media Applications in Mobile Computing Environments", 1997, IEEE, p. 152–160.*

Fox et al, "Security on the Move: Indirect Authentication Using Kerberos" 1996, ACM, p. 155–164.*

"Roxy + User's Guide", Mar. 25, 2000, Program Version 3.00, p. 1–44.*

Chapman & Zwicky, O'Reilly & Associates, Inc. "Building Internet Firewalls". Chapter 4, pp. 57–89, Chapter 6, pp. 131–188, and Chapter 7, pp. 189–205. Nov., 1995.

* cited by examiner

Primary Examiner—Gail Hayes
Assistant Examiner—Christopher Revak
(74) Attorney, Agent, or Firm—Rabin & Berdo, P.C.

(57) ABSTRACT

When a remote access terminal connected to a first Intranet receives provision of services from a second Intranet, a web server of the first Intranet loads a remote service execution environment to the remote access terminal. The second Intranet dynamically installs a service proxy on the second dynamic proxy server. Next, the second Intranet supplies a remote service interface to the remote access terminal via a first dynamic proxy server and second dynamic proxy server. The service proxy receives provision of services from the second Intranet instead of the remote service interface. The network of the present invention dynamically install service proxies on a dynamic proxy server when multiple Intranets are connected, and therefore, firewall tunneling by service unit is possible.

25 Claims, 12 Drawing Sheets

- 711 PROXY → EXECUTION COMMAND
- 712 EXECUTION REQUEST → AUTHENTICATION COMMAND
- 708 I/F REQUEST → ISSUE COMMAND
- 709 I/F → AUTHENTICATION COMMAND
- 705 SEARCH REQUEST → AUTHENTICATION COMMAND
- 706 SEARCH RECEPTION → ISSUE COMMAND
- 707 SERVICE SEARCH
- 710 I/F
- 713 SERVICE
- 701 PROXY
- 702 (block containing): I/F REQUEST, I/F, SEARCH REQUEST, SEARCH RECEPTION — MATCHING
- 703 PROXY
- 704 OBJECT MATCHING MECHANISM

NETWORK SYSTEM USING A FIREWALL DYNAMIC CONTROL METHOD

BACKGROUND OF THE INVENTION

1. Field of the Invention

The present invention relates to a network system such as a VPN (Virtual Private Network), and more particularly to a network system that uses a firewall.

2. Description of Related Art

In recent years, networks which connect multiple Intranets to each other using the internet have been proposed. The concerned networks are called extranets.

The VPN is known as such an extranet. By constructing a VPN, it is possible to dynamically form a work group that extends within a company or between companies. By forming a dynamic network, it is possible to link application groups in each Intranet with the internet as a base network.

When constructing an extranet, flexibility and security must be ensured for each Intranet. To ensure flexibility and security, it is necessary to construct work groups between users for which access to information and services is restricted but for which there is no physical network restriction. In addition, to ensure flexibility and security, it is necessary to provide a flexible and unified interface as the interface used to provide services to work groups and to connect and disconnect users.

An extranet using a VPN can be viewed as a virtual extension of an Intranet. Therefore, it is preferable if the environmental conditions of each Intranet that forms a work group are the same as the environmental conditions of the Intranet operated individually. To accomplish this, it is preferable to use the same firewall as that when accessed from an outside terminal as the firewall that protects the Intranet when accessing from another internet.

With an Intranet operated individually, there are firewalls that use the methods shown below as firewalls for protecting the Intranet when accessing from an outside terminal. These methods can be used individually or in hybrid form to construct a firewall.

(1) Packet Filtering Method

This method determines packets that can pass through a firewall based on IP (Internet Protocol) addresses of data subject to communication, communication port numbers that show the type of application subject to services provided to the client, etc.

(2) Circuit Level Gateway Method

This method executes relay or proxy response of send data for specific applications at the TCP (Transmission Control Protocol) layer level. This method uses a standard technology called SOCKS.

(3) Application Gateway Method

This method installs a proxy program that executes proxy responses for each protocol to operate specific applications such as HTTP (Hyper Text Transfer Protocol) or FTP (File Transfer Protocol).

(4) Expansion Packet Filtering Method

This method registers a script for which the transactions between requests and responses have been put into rule form to a firewall for each application, and allows only packets which satisfy the rules to pass through.

However, when using the methods described above as a firewall for protecting Intranets that form a work group, in other words, a firewall for protecting the Intranet from access from other Intranets, there are the following disadvantages.

With the packet filtering method, IP addresses are monitored as described above, but these IP addresses are set for each client (the computer that is the user terminal). Because of this, with this method, there is a fixed relationship between the client and server (computer providing services within the firewall), so it is not possible to ensure flexibility when forming a dynamic work group. Also, to perform monitoring of IP addresses for each packet, it is not possible to ensure sufficient operating capability with software installation of a firewall, making it necessary to construct a firewall with dedicated hardware.

With the circuit level gateway method, handling at the TCP (Transmission Control Protocol) layer is required. Therefore, when mounting a firewall on an Intranet, it becomes necessary to replace the TCP/IP library groups at the client OS (Operating System) layer. It also becomes necessary to make software changes for server applications when TCP/IP changes occur.

With the application gateway method, a proxy program within the firewall must be provided for each element application to construct work groups. Because of this, when adding element applications in an Intranet, it becomes necessary to newly develop proxy programs and to make firewall setting changes.

With the extension packet filtering method as well, as with the application gateway method, when adding element applications in an Intranet, it becomes necessary to newly register scripts and to make firewall setting changes.

These reasons make it difficult to use a firewall used by individually-operated-Intranets for an extranet.

SUMMARY OF THE INVENTION

An object of the present invention is to provide a suitable firewall for an extranet.

To achieve this, the network system of the present invention comprises a first Intranet and second Intranet connected to each other with the internet as a base, a first dynamic proxy server for forming a firewall to protect the first Intranet, a second dynamic proxy server for forming a firewall to protect the second Intranet, a remote access terminal connected to the first Intranet, a first object directory server installed in the first Intranet to determine if the service requested using the remote access terminal is provided in the first Intranet or provided in the second Intranet, and a second object directory server installed in the second Intranet to dynamically install a service proxy in the second dynamic proxy server when the service is provided in the second Intranet.

With such a structure, it is possible to protect multiple Intranets with a firewall while connecting and providing services to each other using the internet as a base.

BRIEF DESCRIPTION OF THE DRAWINGS

Other objects and advantages of the present invention are described with reference to the attached figures as noted below.

FIG. 7 is a block diagram that conceptually illustrates the structure of the service shared space within the dynamic proxy server shown in FIG. 3;

DESCRIPTION OF THE PREFERRED EMBODIMENTS

Following, I will use the figures to explain preferred embodiments of the present invention.

First Embodiment

As a first preferred embodiment, I will explain an example when the present invention is used for a one directional processing method remote service.

Figure 1:
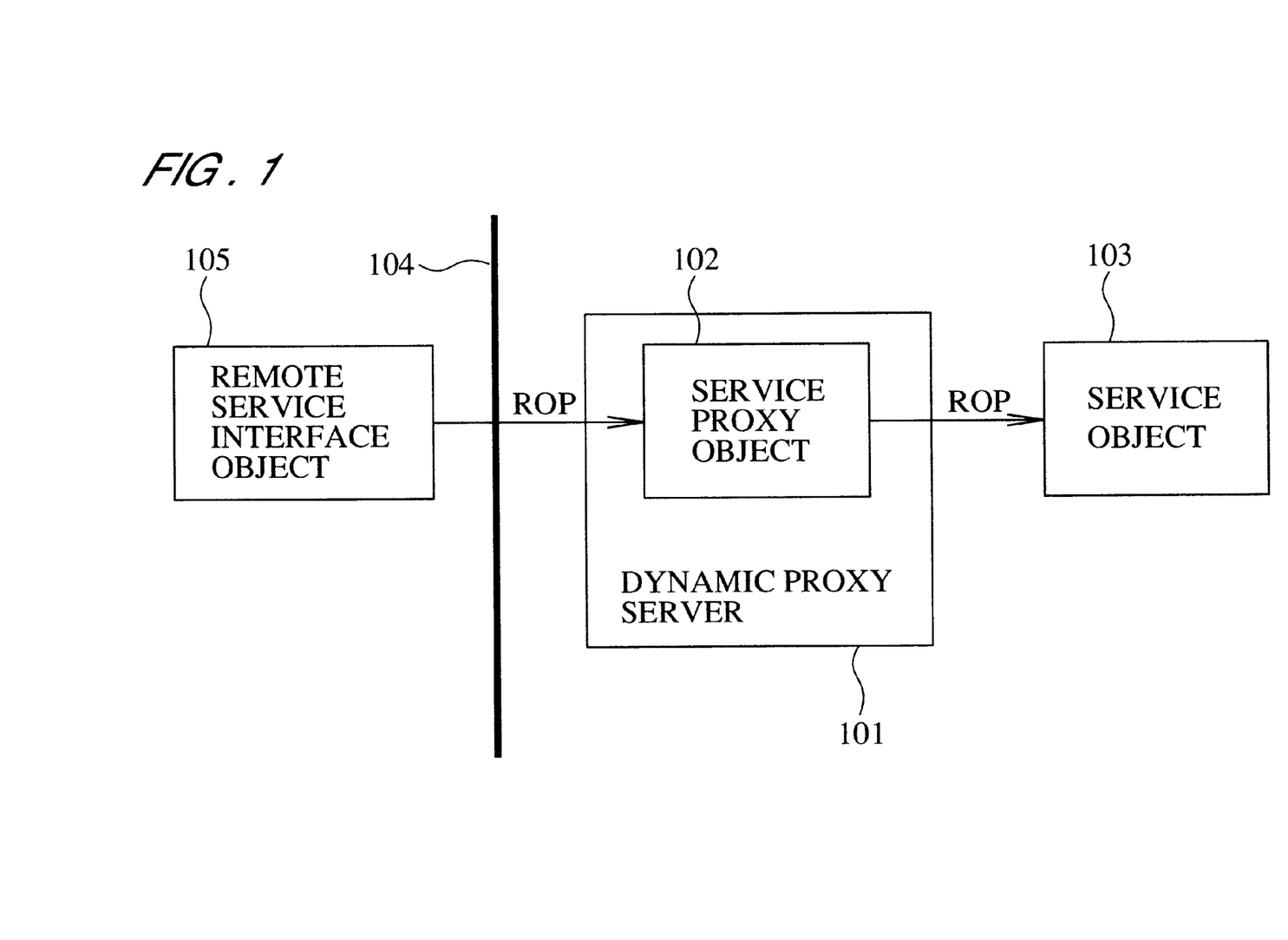
FIG. 1 is a conceptual figure showing an overview of the firewall dynamic control method based on a first preferred embodiment of the present invention.
Figure 2:
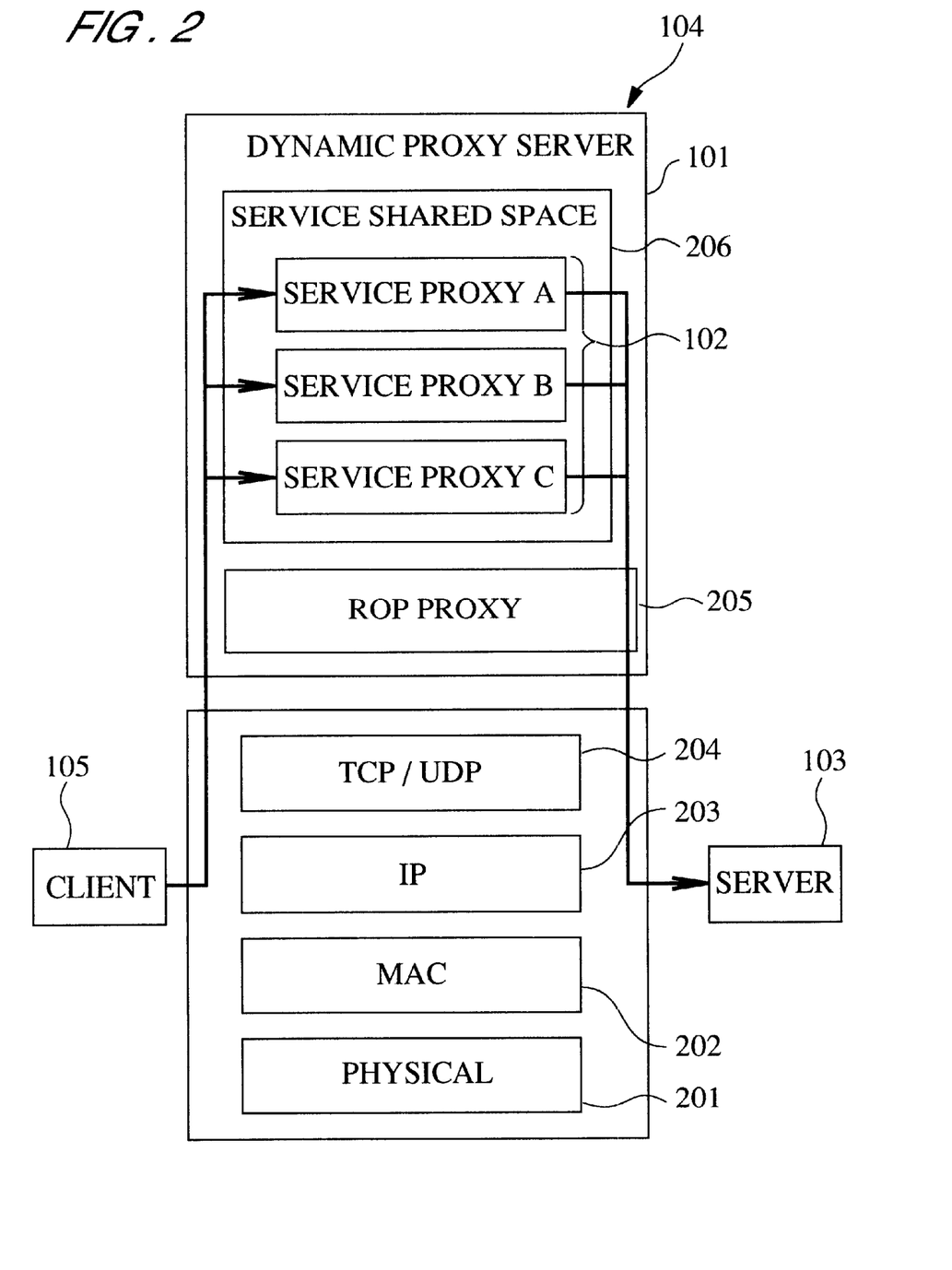
FIG. 2 is a conceptual figure showing the structure of a firewall based on the first preferred embodiment.

First, using FIGS. 1 and 2, I will give a conceptual description of an overview of this preferred embodiment.

FIG. 1 is a conceptual figure showing an overview of the firewall dynamic control method (dynamic proxy server method) of this preferred embodiment.

As shown in FIG. 1, with this method, a dynamic proxy server 101 for distributed object service is connected to each Intranet. By service object 103 in the Intranet, service proxy object 102 is dynamically installed within server 101. By installing server 101, service object 103 is conceptually protected by both firewall 104 and server 101. Remote service interface object 105 uses proxy object 102 to access service object 103. Remote object protocol (ROP), for example, can be used for communication between interface object 105 and proxy object 102 and between proxy object 102 and service object 103. ROP is a communication protocol for connecting objects between two computers connected by a network.

FIG. 2 is a conceptual figure showing the structure of a firewall of this preferred embodiment.

As shown in FIG. 2, firewall 104 based on this preferred embodiment is set as dynamic proxy server 101 on the upper layer of the layered structure comprising physical layer 201, MAC (Media Access Control) layer 202, IP (Internet Protocol) layer 203, and TCP/UDP (Transmission Control Protocol/User Datagram Protocol) layer 204. This proxy server 101 comprises ROP proxy 205 which is a proxy program that performs processing for handling ROP and service shared space 206. Then, multiple service proxy objects 102 are each dynamically installed within this service shared space 206.

When interface object 105 as a client accesses service object 103 as a server, a certain process reaches service object 103 via ROP proxy 205 and service shared space 206.

In contrast, when accessing another Intranet dynamic proxy server 101 from within the Intranet, by ROP proxy 205 interpreting the protocol, the certain process is sent outside without passing through service shared space 206.

Figure 3:
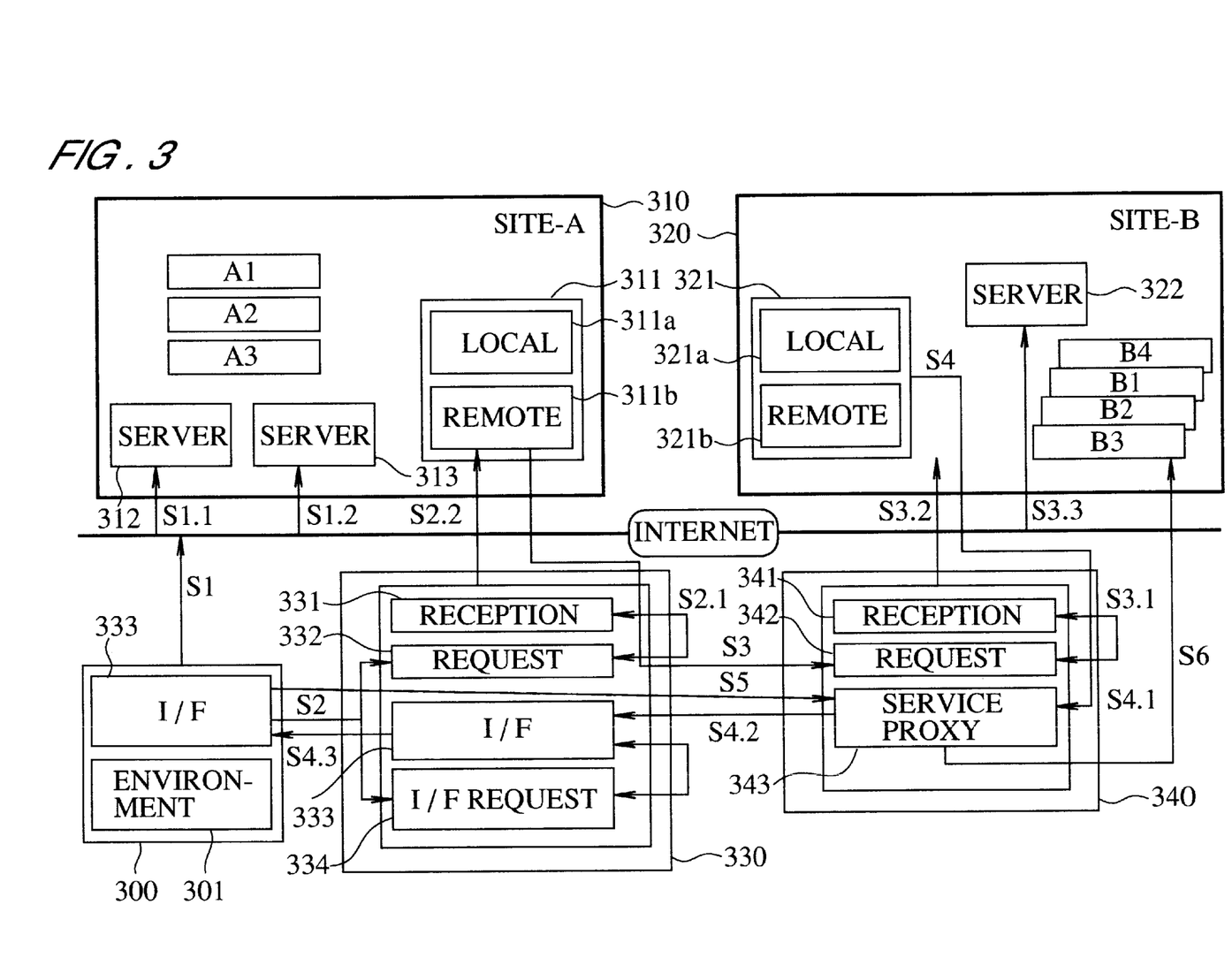
FIG. 3 is a figure that conceptually illustrates the overall structure of a network system based on the first preferred embodiment.

FIG. 3 conceptually illustrates the overall structure of the network system of this preferred embodiment.

Following, I will explain the system shown in FIG. 3 using an example when remote access terminal. 300.connected to a site-A Intranet 310 accesses service B3 within a site-B Intranet 320.

As shown in FIG. 3, a dynamic proxy server 330 is connected to the site-A internet 310 and a dynamic proxy server 340 is connected to a site-B Intranet 320. Specifically, the firewall constructed by the proxy server 330 protects the site-A Intranet 310, and the firewall constructed by the proxy server 340 protects the site-B Intranet 320.

A remote service execution environment 301 for executing access to the site-A Intranet 310 is downloaded from a web server 313 to a remote access terminal 300.

This execution environment 301 comprises a function for receiving a remote service interface 333 from the proxy server 330 and a function that uses this remote service interface 333 for accessing the site-A Intranet 310.

The site-A Intranet 310 comprises an object directory server 311, an authentication server 312, and a web server 313. Also, services A1 to A3 are registered as service objects in this site-A Intranet 310. As described above, the remote access terminal 300 is connected to the site-A Intranet 310.

The object directory server 311 is a server that performs service and object registration, deletion, and searching. The server 311 comprises a local site reference unit 311a and a remote site reference unit 311b. The local site reference unit 311a performs registration and other processes for service objects within the site-A Intranet 310, that is services A1 to A3. The remote site reference unit 311b performs registration and other processes for information necessary for searching for service objects of other Intranets. With this preferred embodiment, the reference unit 311b performs processes such as registration for the object directory server 321 within the site-B Intranet 320 to make it possible to search for service objects B1 to B4.

The authentication server 312 performs user authentication and decides whether or not to permit access to services. With this preferred embodiment, the authentication server 312 decides on permission or rejection for access from the remote access terminal 300.

The web server 313 is a server for transmitting the remote service execution environment 301 to the remote access terminal 300.

The site-B Intranet 320 comprises at least an object directory server 321 and an authentication server 322. Also, as described above, service objects B1 to B4 are registered in this site-B Intranet 320.

The object directory server 321 is a server that performs registration, deletion, and searching of service objects. The server 321 comprises a local site reference unit 321a and a remote site reference unit 321b. The local site reference unit 321a performs processes such as registration for services B1 to B4. The remote site reference unit 321b performs registration and other processes necessary for searching for service objects A1 to A3.

The authentication server 322 determines whether services requested from the site-A Intranet can be executed or not.

A dynamic proxy server 330 stores a search reception 331, a service search request 332, a remote service interface 333 and a remote service interface request 334.

The search reception 331 is an object that receives service object search requests from outside the site-A Intranet 310. Specifically, the remote access terminal 300 that is a client of the object directory server 311 and the object directory server 321 of the site-B Intranet 320 send search requests to this search reception 331 when searching for a service of the site-A Intranet 310.

The service search request 332 makes a request for search to the object directory servers 311 and 321 based on the request received by the search reception 331.

The remote service interface 333 is an object used when the remote service execution environment 301 accesses the site-A Intranet 310, as described above. The remote service interface 333 is sent to the remote service execution environment 301 from the dynamic proxy server 330.

The remote service interface request 334 is an object for having the remote service interface 333 be received by the remote service execution environment 301. This request 334 is provided in the dynamic proxy server 330 by the remote service execution environment 301.

The dynamic proxy server 340 stores a search reception 341, a service search request 342 and a service proxy 343.

The search reception 341 is an object that receives requests for service object searches. The object directory server 311 of the site-A Intranet 310 sends search requests to this search receiver 341 when there is a search for a service of the site-B Intranet 320.

The service search request 342 performs a search request to the object directory servers 311 and 321 based on requests received by the search receiver 341.

The service proxy 343 is dynamically installed within the dynamic proxy server 340 that is the service proxy 102 explained using FIGS. 1 and 2.

Figure 4A:
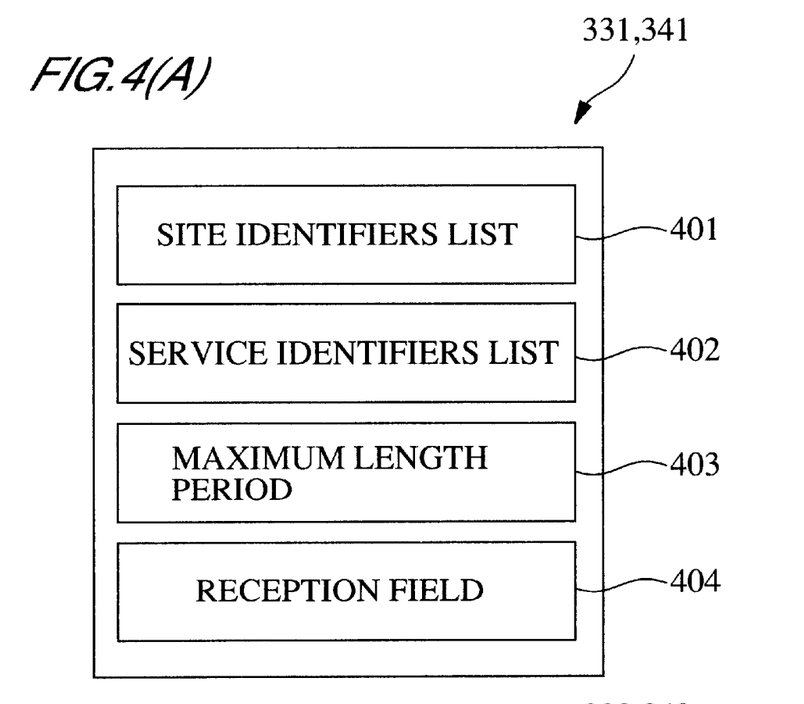
FIG. 4(A) is a block diagram showing an overview of the construction of objects search reception for as shown in FIG. 3.

FIG. 4 (A) is a block diagram showing an overview of the object structure of the search receptions 331 and 341 shown in FIG. 3.

In FIG. 4 (A), a site identifiers list 401 stores identifiers of sites (terminals and servers) that can make search requests to these search reception 331 and 341.

A service identifiers list 402 stores identifiers of services that can be received by external sites.

A maximum length period 403 stores the value of the maximum length period a service can be provided.

A reception field 404 receives certification of permission for connection for sites that receive services.

Furthermore, when a field specified as a list has 1 element, for example if the list 402 is 1 element, the search receiving objects 331 and 341 can be provided for each service.

For example, when the remote access terminal 300 wants to receive service B3 of the site-B Intranet 320 using the site-A Intranet 310, the identifier of the site-A Intranet must be registered in the site identifiers list 401, and the identifier of the service B3 must be registered in the service identifiers list 402.

Figure 4B:
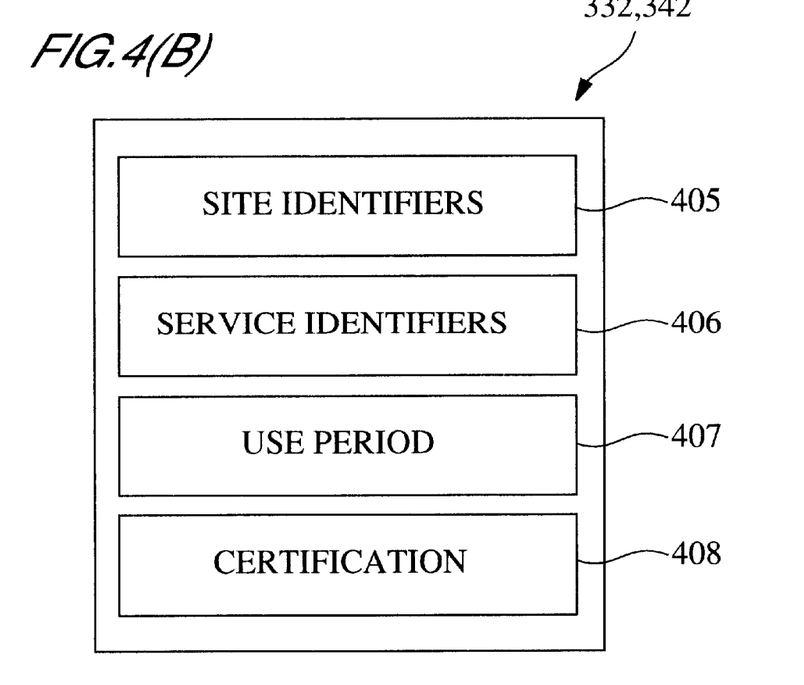
FIG. 4(B) is a block diagram showing an overview of the construction of objects for which a service search request has been made as shown in FIG. 3.

FIG. 4(B) is a block diagram that shows an overview of the object structure of the service search requests 332 and 342 shown in FIG. 3.

In FIG. 4(B), a site identifier 405 is an identifier of the site that made the search request.

A service identifier 406 is an identifier for identifying the service that is the target of the search.

A use period 407 is the period that the site desires to use the target service.

A certification 408 is a certification giving permission for the site requesting the service to connect, and is used by the concerned site.

For example, when as described above, the remote access terminal 300 receives service B3 of the site-B Intranet 320 using the site-A Intranet 310, the site identifier 405 is the identifier of the site-A internet and the service identifier 406 is the identifier of service B3.

Here, I show an example of the field matching rule between search reception objects and service search request objects. Matching is achieved when all of the following conditions have been met.
(1) The site identifier 405 is contained in the site identifier list 401.
(2) The service identifier 406 is contained in the service identifier list 402.
(3) The use period 407 is shorter than the maximum length period 403.
(4) Matching is implemented unconditionally, and the certification 408 is bound to the field 404.

Figure 5:
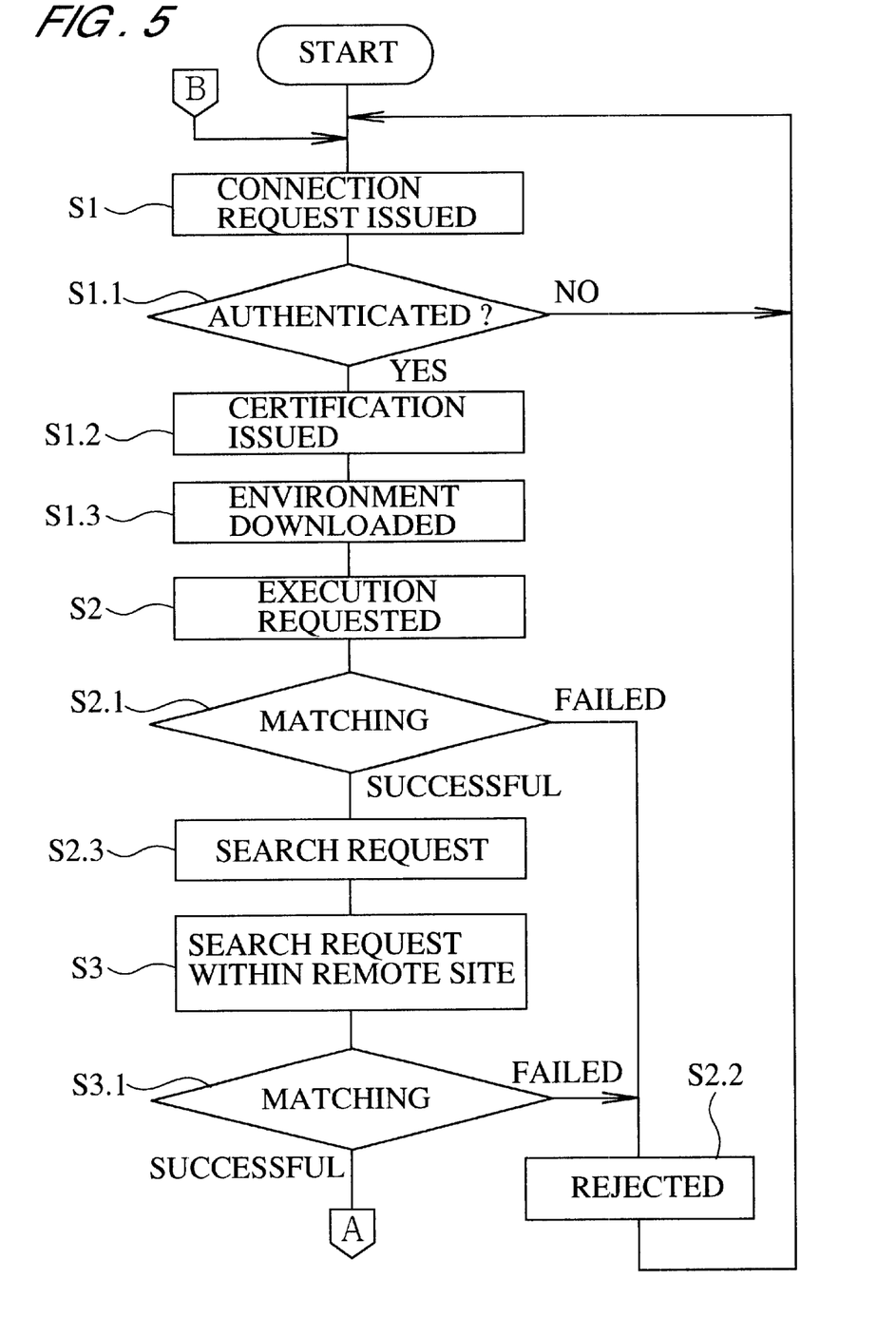
FIG. 5 is a flow chart showing the operation of the network system shown in FIG. 3.
Figure 6:
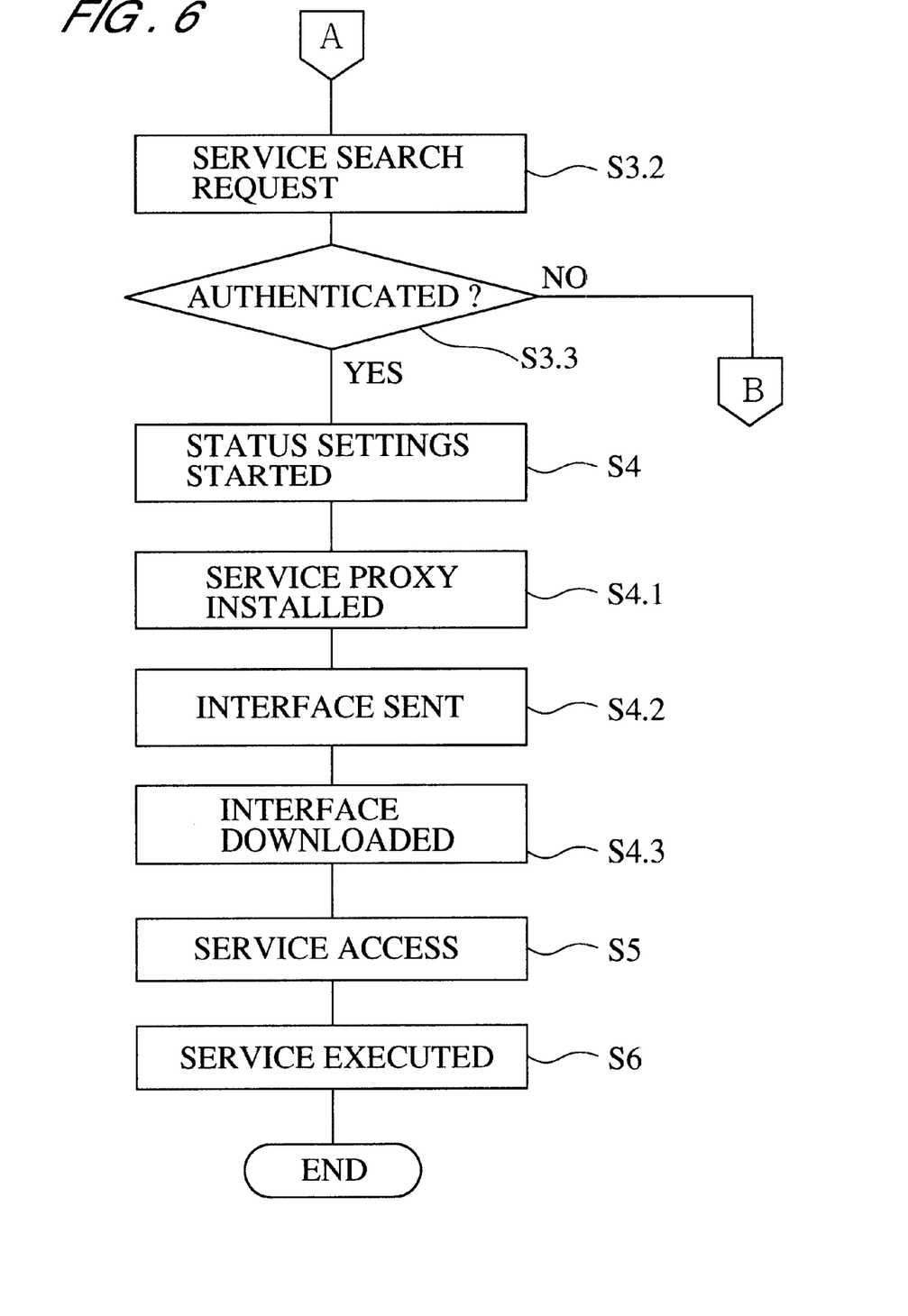
FIG. 6 is a flow chart showing the operation of the network system shown in FIG. 3.

Next, I will discuss operation of the network system of this preferred embodiment using an example when the remote access terminal 300 receives service B3 of the site-B Intranet 120 using the site-A Intranet 310, and will give an overview using FIGS. 3, 5, and 6.

FIGS. 5 and 6 are flow charts that show the operation of this network system.

First, as shown by S1 in FIGS. 3 and 5, the remote access terminal 300 issues a connection request to the site-A Intranet 310.

As shown in S1.1, the authentication server 312 decides whether to permit connection or not. Then, the authentication server 312 issues a connection permission certification when connection is permitted, and gives notification that the request has been rejected when connection is not permitted.

When connection is permitted, as shown by S1.2, the terminal 300 sends a connection permission certification to the web server 313. Then, as shown by S1.3 in FIG. 5, the terminal 300 downloads the environment 301 from the web server 313, and then prepares for remote access.

Next, as shown by S2, the terminal 300 issues a request to execute service B3. The search request 332 and the interface request 334 are sent to the server 330 as this execution request from the terminal 300. As shown by S2.1, the server 330 performs the field matching process (described above) using the received objects 332 and 334, and prepares for service search processing after.

Here, as shown by S2.2, when matching fails and search reception 331 denies the reception of the service search request, the server 330 deletes the service search request 332 and the remote service interface request 334 from the server after a specified time has elapsed. This ends the network system process operation.

In contrast, as shown by S2.3, when matching is successful and the search receiver 331 accepts the search request 332, the server 330 issues to the object directory server 311 a search request for service B3 based on the service identifier 406 stored in the search request 332.

The server 311 judges that this search request is not for a local service, specifically service in the site-A Intranet 310, but rather a request for a service in the site-B Intranet 320. Then, as shown by S3, to access the object directory server 321 within the site-B Intranet 320, the server 311 send the service search request 342 to the dynamic proxy server 340.

As shown by S3.1, the server 340 performs field matching processing between the search reception 341 and the received search request 342, and then prepares service search processing.

Here, when matching fails and the search reception 341 denies the reception of the service search request, the server 340 deletes the search request 342 from the server after a specified time has elapsed. This ends the network system processing operation.

In contrast, when matching is successful and the search reception 341 receives the service search request, as shown in S3.2 of FIGS. 3 and 6, the server 340 issues a search request for service B3 based on the service identifier 406 stored in the service search request 332 to the object directory server 321.

As shown by S3.3, the authentication server 322 decides whether to permit use of the service or not based on the connection permission certification stored in the search request 342. The authentication server 322 makes a certification to the site-A Intranet 310 of the connection permission certification when connection is permitted, and notifies it that the request has been rejected when not permitted.

As shown by S4, when connection is permitted, the server 321 performs the following settings to make it possible to use service B3 from the site-A Intranet 310.

First, as shown by S4.1, the service proxy 343 that is the service B3 proxy is provided in the dynamic proxy server 340. In this way, with this embodiment, in contrast with conventional firewalls, the service proxy 343 is not provided in advance in the proxy server 340, but rather is dynamically installed according to the issuance of the search request 342.

Next, as shown by S4.2, the remote service interface 333 which is an interface object for accessing the service proxy 343 from a remote site is sent to the server 330 (S4.2).

The server 330 performs the matching process between the interface 333 and the interface request 334. Then, when the interface 333 is judged to be the target object, specifically the object for using the service B3, as shown by S4.3, the server 330 loads this object 333 onto the execution environment 301 of the terminal 300.

After the above settings are complete, as shown by S5, the terminal 301 issues to service B3 a processing request using the interface 333 on the execution environment 301. This processing request is received by the proxy 343 within the server 340 via the server 330.

The proxy 343 accesses service B3 instead of the terminal 301. Thus, as shown by S6, service use from a remote site is realized.

Next, I will give a detailed explanation of the operation of the server 340 while referring to FIG. 7.

FIG. 7 is a block diagram that conceptually shows the structure of the service shared space within the server 340.

This service shared space comprises a service shared space operation protocol handler 701, a service search space 702, a service proxy space 703, and an object matching mechanism 704.

The handler 701 is a module that operates the publish command, subscribe command, and execute command which are Remote Object Protocol (ROP) commands that will be described later.

The search space 702 performs the following matching process based on the matching mechanism 704.

First, the search space 702 performs matching processing between a service search request object 705 and a search receiving object 706. The object 705 correlates to the service search request 332 shown in FIG. 3, and the object 706 correlates to the search receivers 331 and 341 shown in FIG. 3. The object 705 is executed as an authentication command via the handler 701 by the instructions of the remote service execution environment 301. The object 706 is executed as an issue command via the handler 701 by the instructions of the server 311 or the server 321. Note that the object 706 goes to standby during matching. When matching is successful, this indicates that there are usable service search targets. When matching succeeds, a service search 707 is issued. In contrast, when matching fails, after a specified amount of time has elapsed from the time failure is determined, the object 705 is deleted.

Second, the search space 702 performs matching processing between an interface object 709 and an interface request object 708. The object 709 correlates to the remote service interface 333 shown in FIG. 3, and the object 708 correlates to the remote service interface request 334 shown in FIG. 3. The search space 702 is executed as an authentication command via the handler 701 by the instructions of the server 311 or the server 321. The object 708 is executed as an issue command via the handler 701 by the instructions of the execution environment 301. In this case, the success of matching shows that interface 709 has been received and the object 708 is loaded. In contrast, when matching fails, after a specified amount of time has elapsed from the time failure is determined, the object 708 is deleted.

In the proxy space 703, A service proxy object 711 is provided. This object 711 is executed as an issue command via the handler 701 by instructions from the servers 311 and 321. A service execution request object 712 is sent to this object 711, and with this sending process, the actual calling of the service 713 is executed. The execution request object 712 is executed as an execution command by the handler 701 when a service execution request is generated by the interface 333.

Figure 8:
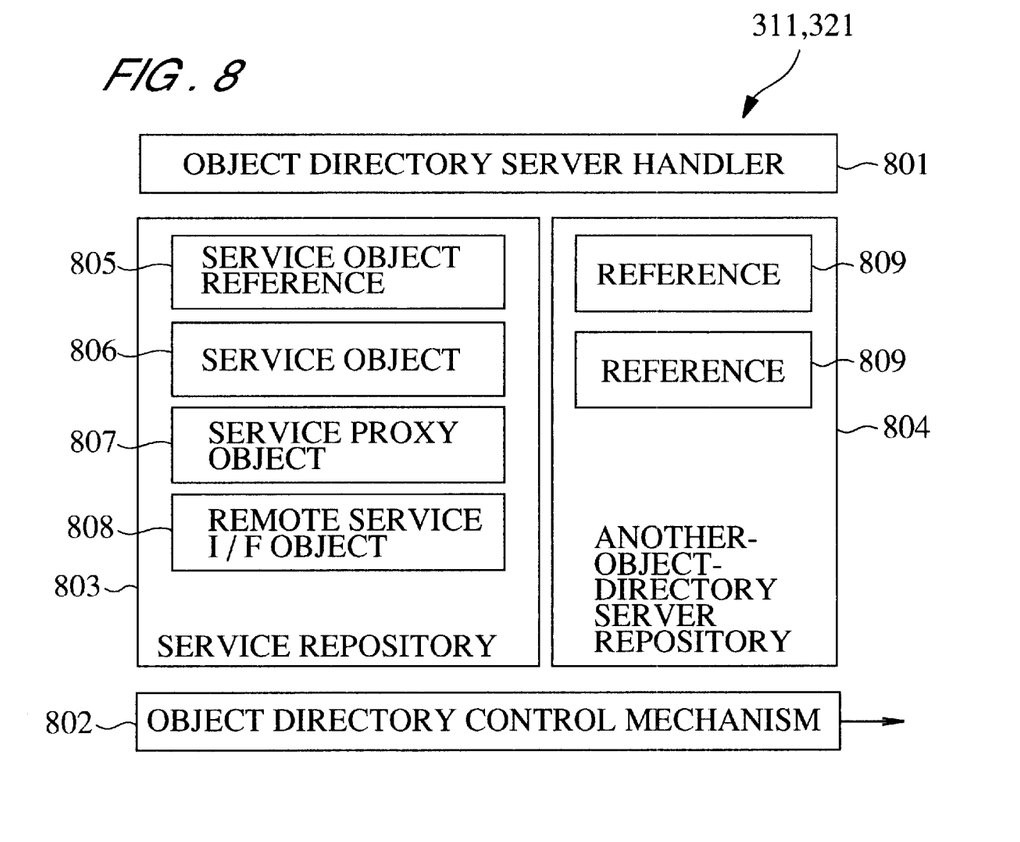
FIG. 8 is a block diagram that conceptually illustrates the structure of the object directory server shown in FIG. 3.

Next, I will explain in detail the operation of the object directory servers 311 and 321 using FIG. 8 for reference.

FIG. 8 is a block diagram that conceptually shows the structure of the object directory servers 311 and 321.

The servers 311 and 321 comprise an object directory server handler 801, an object directory control mechanism 802, a service repository 803, and another-object-directory-server repository 804.

The handler 801 executes registration, deletion and search processes for the elements of the repositories 803 and 804. With this embodiment, the handler 801 sends the object 706 as an execution command to the search space 702 in the servers 330 and 340, receives the object 707 after matching processing by the object 706 is completed.

The repository 803 stores a service object reference 805 that are data related to services within the local site, a service object 806, a service proxy object 807, and a remote service interface object 808.

The reference 805 is a service object reference.

The object 807 is an object that provides the service itself.

The object 808 is an object sent as an execution command to the remote site service shared space to permit access from a remote site.

The repository 804 stores another-object-directory-server reference 809. The reference 809 is a reference used when searching for service objects of other sites.

The control mechanism 802 controls data in each repository which become object directory entries. When searching for services, the control mechanism 802 first performs a search for service objects within the local site, specifically, for the service repository 803 within the object directory server provided in the same site-As the concerned control mechanism 802. Then, when, service objects that are the subject of the search do not exist within the local site, using the reference 809 stored in the repository 804, it executes a service search request to another object directory server.

Figure 9:
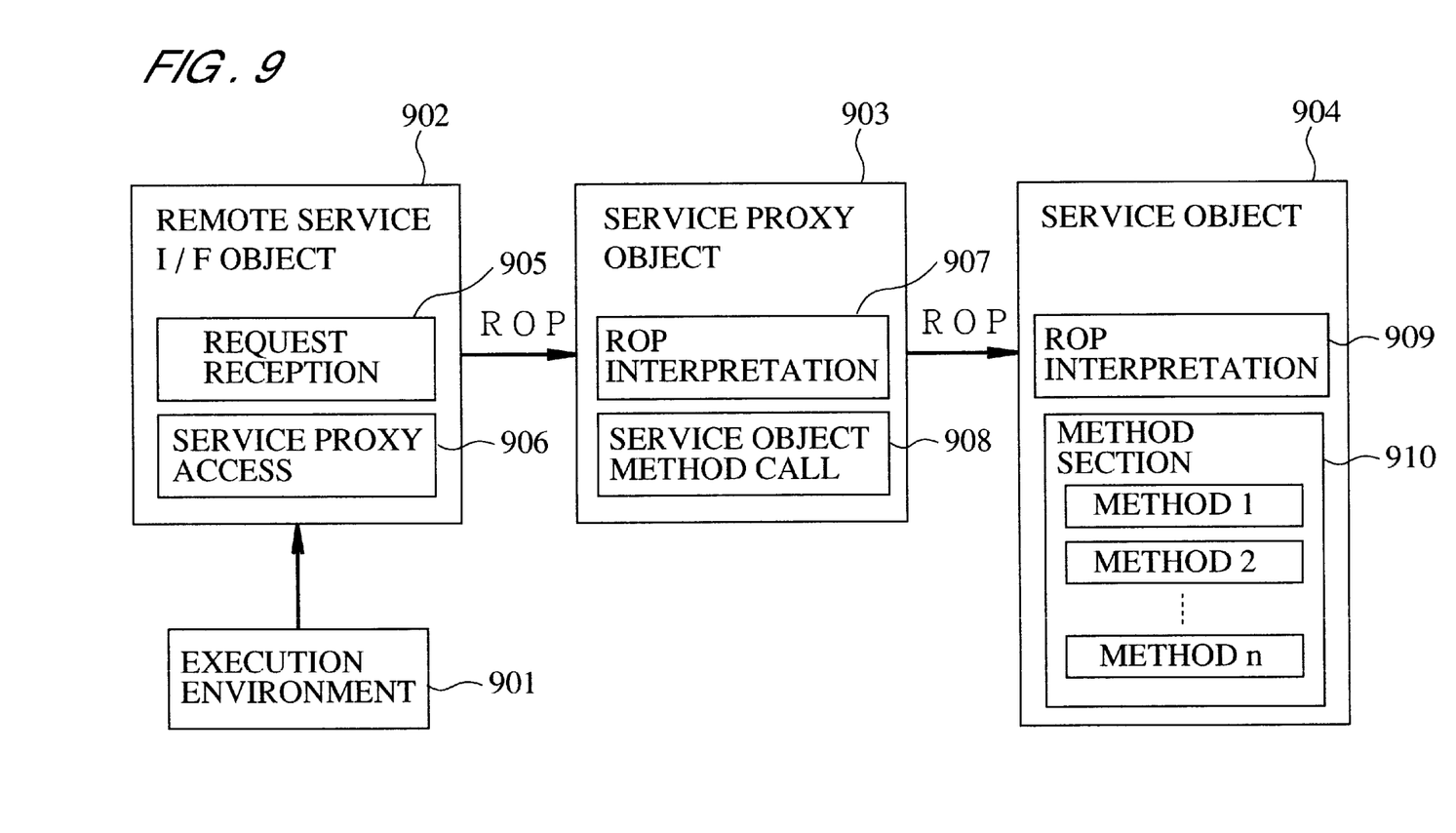
FIG. 9 is a flow chart for explaining the procedure for accessing remote services shown in FIG. 3.

Next, in relation to the network system of this embodiment, I will give a detailed explanation using conceptual FIG. 9 regarding the means of executing access to remote services after an environment for using remote services has been set.

As shown in FIG. 9, with this embodiment, a remote service interface object 902 is provided on a remote service execution environment 901, and a service proxy object 903 is provided on the service shared space 703 within the dynamic proxy server. In addition, when the service object 904 is in a state allowing remote access, it becomes possible to perform an communication between the objects 902, 903, and 904 according to Remote Object Protocol (ROP). The remote service execution environment 901 corresponds to the remote service execution environment 301 shown in FIG. 3, the remote service interface object 902 corresponds to the remote service interface shown in FIG. 3, the service proxy object 903 corresponds to the service proxy 343 shown in FIG. 3, and the service object 904 corresponds to service B3 shown in FIG. 3.

Remote object communication using ROP starts when a startup request is issued to the interface object 902 on the execution environment 901. After this startup request is issued, a startup request reception process 905 within the object 902 is executed.

With the reception process 905, the service proxy access 906 is executed. With the access 906, the processing request is encapsulated within the execution command, and this is sent to the service proxy object 903 according to ROP.

The proxy object 903 interprets the received command by executing an ROP interpreting process 907. Then, the proxy object 903 executes the service object method call 908 based on the interpreted command. This method call 908 is sent to the service object 904 according to ROP.

The object 904 interprets the method call 908 by executing an ROP interpreting process 909. Then, the object 904 executes a method corresponding to the method call 908 of the methods 1 through n stored in a method section 910. In other words, conceptually, the object 904 executes the method call 908.

Figure 10:
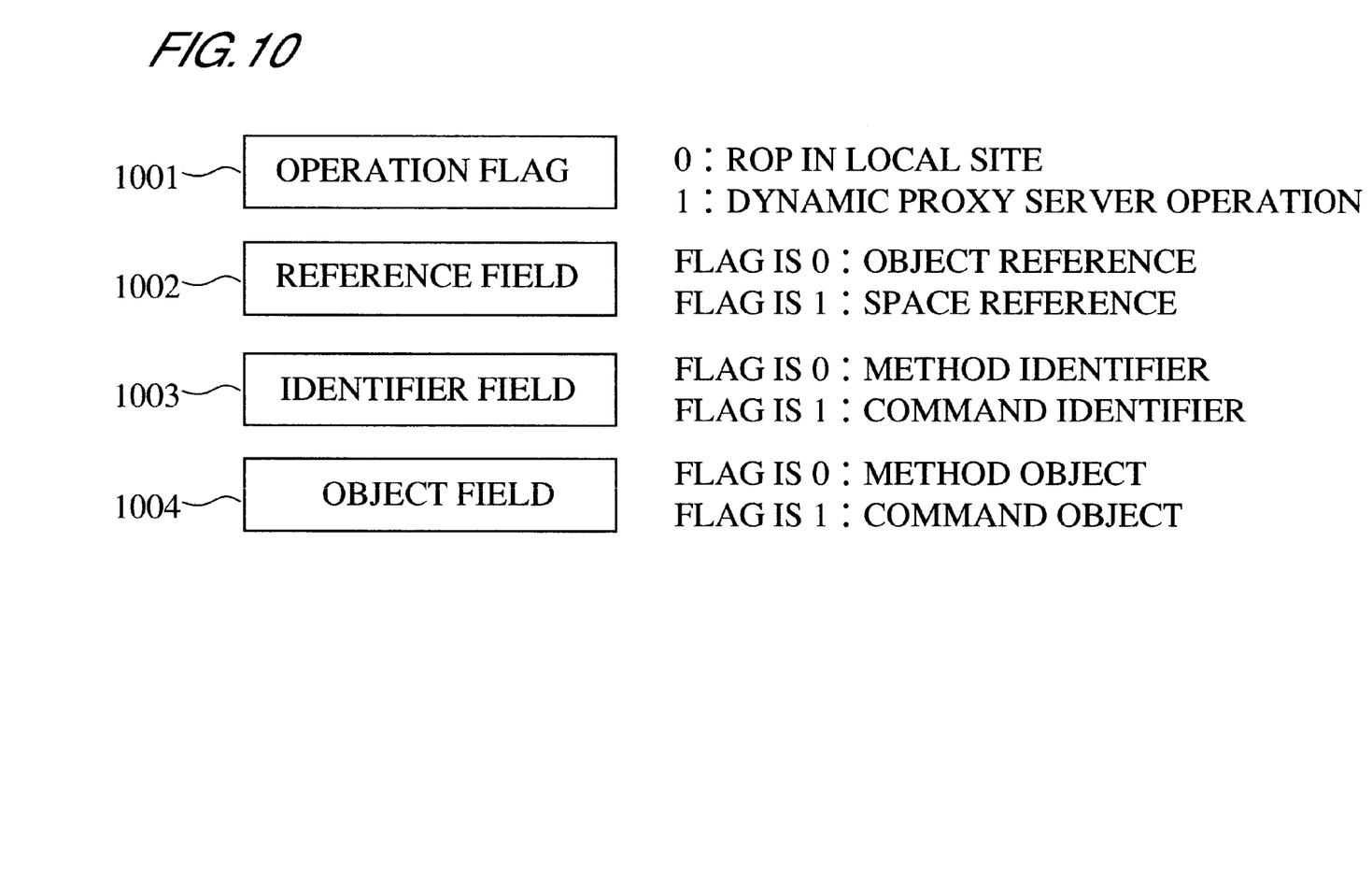
FIG. 10 is a block diagram that conceptually illustrates the data structure of packets used in ROP.

Next, I will explain data communication according to ROP, using FIG. 10 for reference.

FIG. 10 is a block diagram that conceptually shows the data structure of packets used with ROP.

ROP provides a protocol for sending commands that operate the service shared space within the dynamic proxy server shown in FIG. 7, and a protocol for a different process space in the local site to perform object communication.

With a protocol for service shared space operating commands, a dynamic proxy server operating flag 1001 is set to 0. Also, in a reference field 1002 are stored service proxy space references or a service search space references, in an identifier field 1003 are stored identifiers of commands that operate the service shared space (publish command, subscribe command and execute command), and in an object field 1004 are stored objects that correspond to the commands specified by the identifier field 1003. Here, the publish command is specified when operating a service proxy object, a remote service interface object or a search receive object. The subscribe command is specified when operating a service search request object or a remote service interface request object. The execute command is specified when operating an object that executes a processing request to a service proxy object.

In contrast, with a protocol for object communication, the operating flag 1001 is set to 1. In the field 1002 are stored references of service objects that are subjects of communication, in the field 1003 are stored method identifiers of service objects, and in the field 1004 are stored objects that contain parameters necessary for executing methods specified by the identifier field 1003.

In this way, with the network system of this embodiment, it is possible to dynamically install a service proxy on a dynamic proxy server, and therefore, firewall tunneling by service units is possible.

Second Embodiment

Next, as a second embodiment of the present invention, I will explain an example when the present invention is applied for a bi-directional processing method remote service.

With the network system of this embodiment there is a call back function as a function for realizing bi-directional processing. A call back function is a function that calls back the service object access side from the service object side when necessary after the service object is called from the service object access side.

Figure 11:
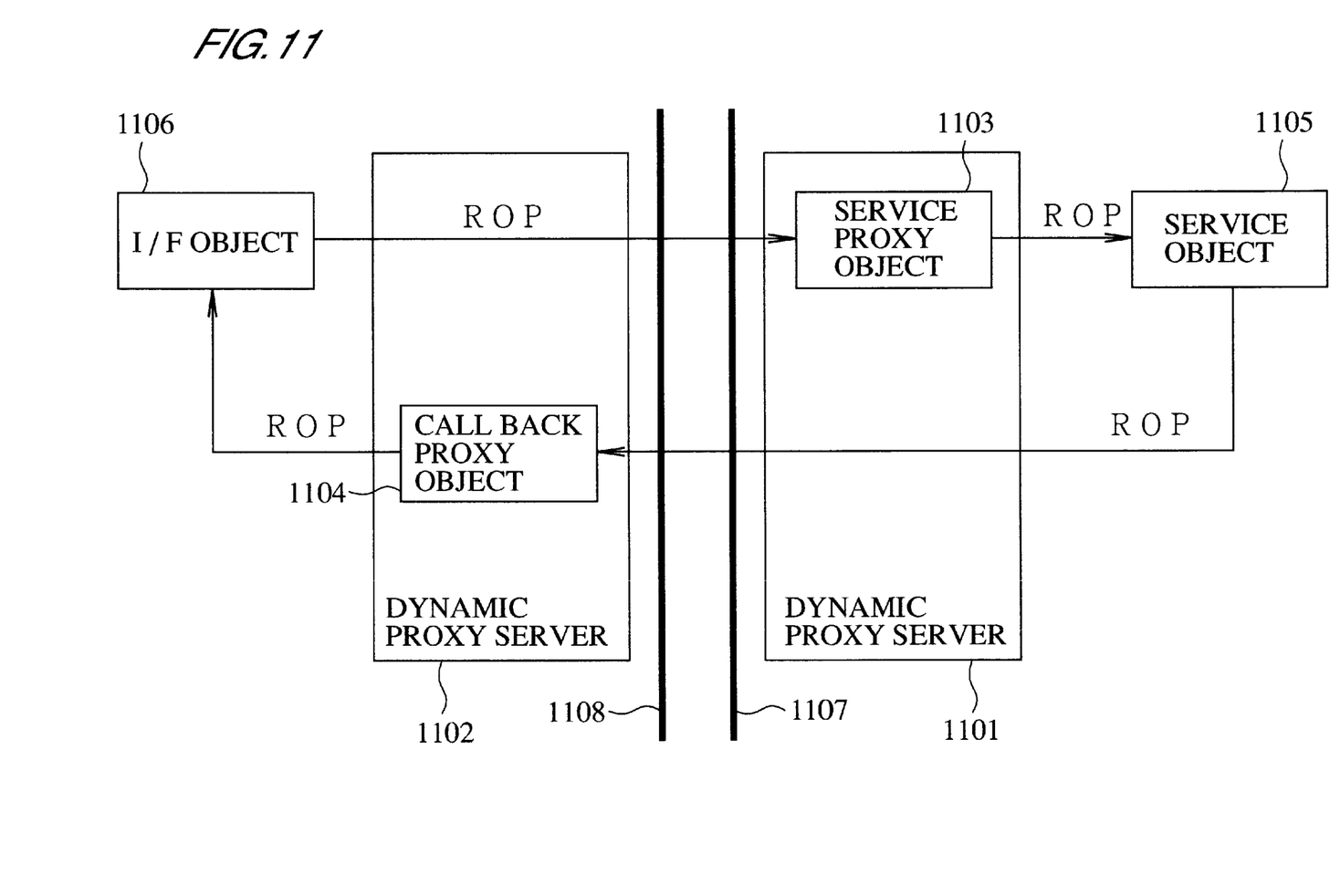
FIG. 11 is a block diagram for giving a conceptual explanation of an overview of the dynamic proxy server used in a second preferred embodiment.

FIG. 11 is a block diagram for conceptually explaining an overview of the dynamic proxy server used with this embodiment.

As shown in FIG. 11, a service proxy object 1103 is dynamically installed within a dynamic proxy server 1101 on the service object providing side. By providing this server 1101, a service object 1105 is protected by a firewall 1107. A remote service interface object 1106 accesses a service object 1105 using the proxy object 1103.

In contrast, a call back proxy object 1104 is dynamically set within a dynamic proxy server 1102 on the service object access side. By providing this proxy server 1102, a remote service interface object 1106 is protected by a firewall 1108. The service object 1105 can perform call back access of the remote service interface object 1106 using the call back proxy object 1104.

The proxy object 1104 can be provided to the server 1102, for example, by sending at the same time as when sending the remote service interface 1106 from the server 1101.

Here, it is possible to use ROP, for example, for the communication between the interface object 1106 and the proxy object 1103, for the communication between the proxy object 1103 and the service object 1105, for the communication between the service object 1105 and the proxy object 1104, and for the communication between the proxy object 1104 and the interface object 1106.

Figure 12:
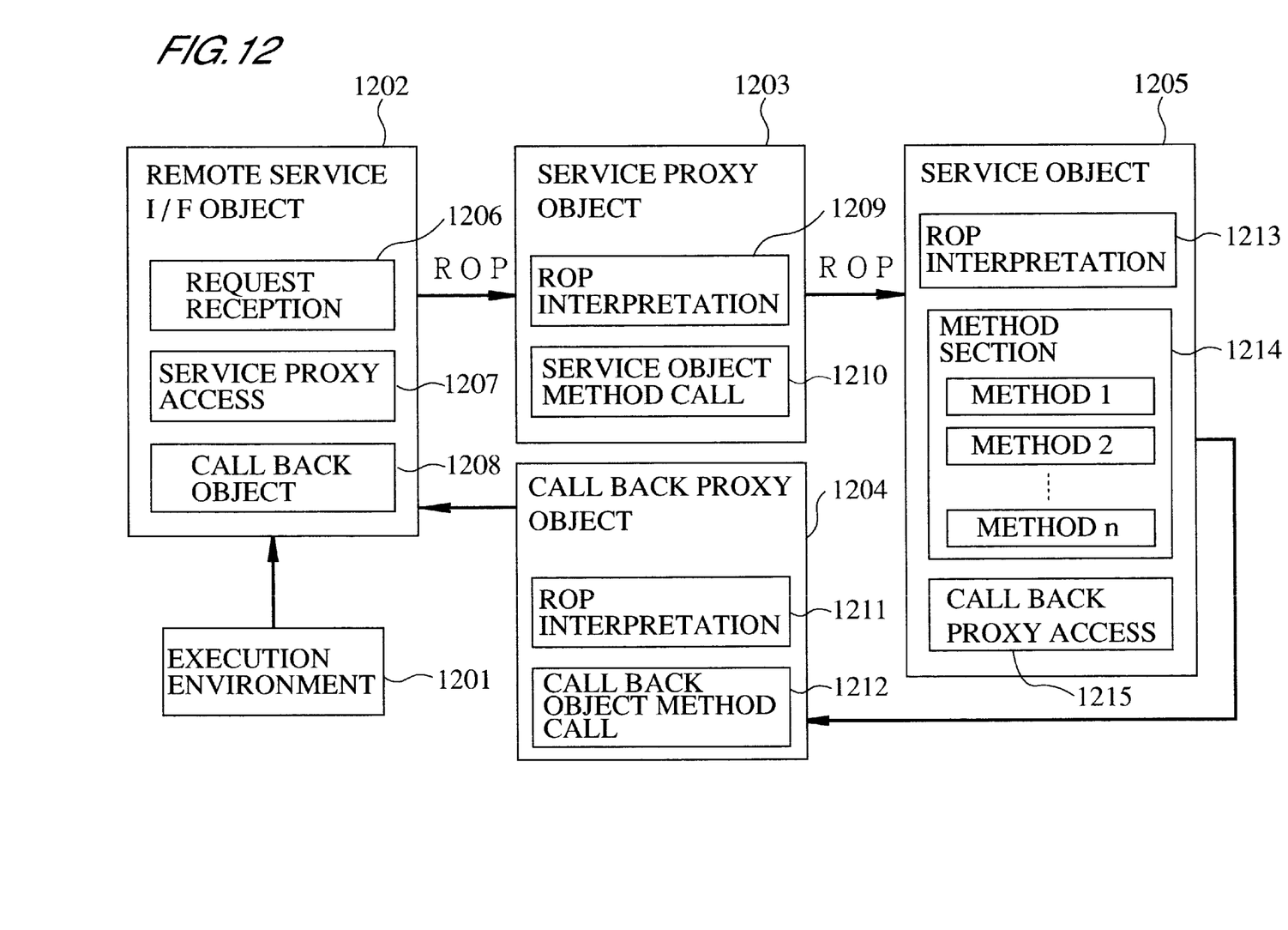
FIG. 12 is a flow chart for explaining the procedure for accessing remote services based on the second preferred embodiment.

I will explain the procedure for executing remote service access for the network system of this embodiment using conceptual FIG. 12 for reference.

FIG. 12 shows the state after an environment for using remote services is provided on a network system.

As shown in FIG. 12, a remote service interface object 1202 is provided on a remote service execution environment 1201, and a service proxy object 1203 is provided on the service shared space within a dynamic proxy server 1101. By providing these objects 1202 and 1203, remote access to a service object 1205 becomes possible. By providing a call back proxy object 1204 on the service shared space within the dynamic proxy server 1102, bi-directional communication using ROP becomes possible. The object 1202 corresponds to the remote service interface object 1106 shown in FIG. 11, the object 1203 corresponds to the service proxy object 1103 shown in FIG. 11, the service object 1205 corresponds to the service object 1105 shown in FIG. 11 and the call back proxy object 1204 corresponds to the call back proxy object 1104 shown in FIG. 11.

When starting remote object communication according to ROP, first, a startup request is issued to the interface object 1202 from the execution environment 1201. Issuing this causes a startup request reception process 1206 within the interface object 1202 to start, and a service proxy access 1207 is executed. With this access 1207, the encapsulated process request is housed in the ROP execution command, and sent to the service proxy object 1203.

The proxy object 1203 receives the process request, interprets the command by executing the ROP interpreting process 1209 and, based on this interpretation, executes a service object method call 1210. The method call 1210 is sent to the service object 1205 according to ROP. An ROP interpreting process 1213 executes interpretation of the method call 1210. The appropriate method of methods 1 through n stored in a method section 1214 is executed according to the results of this interpretation.

When executing methods, when necessary, the service object 1205 side status, etc. is notified to the interface object 1202. When performing this notification, first, to access the remote service interface object 1202, the call back proxy access 1215 is executed. With this access 1215, the encapsulated call back processing request is sent to the call back proxy object 1204.

When the proxy object 1204 receives a call back processing request, the commands are interpreted by executing an ROP interpretation process 1211. Next, the object 1204 executes a call back object method call 1212 according to this interpretation. With this execution, the method call 1212 is sent to the interface object 1202 according to ROP, and a call back object 1208 is executed.

Other structures and operations are the same as for the first embodiment, so I will omit an explanation here.

In this way, with the network system of this embodiment, a call back proxy object has been provided within a dynamic proxy server, so a call back function is realized, making it possible to perform bi-directional firewall tunneling.

As described in detail above, with the present invention, it is possible to mutually connect multiple Intranets and provide services between them using the internet as a base while protecting the multiple Intranets with a firewall.

Also, with the present invention, it is possible to dynamically install a service proxy on a dynamic proxy server, so firewall tunneling by service units is possible.

What is claimed is:

1. A network system using a firewall dynamic control method, comprising:
   a first Intranet and a second Intranet connected to each other with the internet as a base;
   a first dynamic proxy server for forming a firewall to protect said first Intranet;
   a second dynamic proxy server for forming a firewall to protect said second Intranet;
   a remote access terminal connected to said first Intranet:
   a first object directory server provided within said first Intranet for judging whether a service requested by said remote access terminal is provided in said first Intranet or is provided in said second Intranet; and
   a second object directory server provided within said second Intranet to dynamically install a service proxy in said second dynamic proxy server when said service is provided in said second Intranet;
   wherein said first object directory server comprises a first local site reference section that stores services provided in said first Intranet and a remote site reference section that makes requests for searches of services provided in said second Intranet to said second dynamic proxy server.

2. The network system using a firewall dynamic control method according to claim 1, wherein said first Intranet comprises a first authentication server that judges whether access from said remote access terminal is approved or not, and when access is approved, issues a connection permission certification.

3. The network system using a firewall dynamic control method according to claim 2, wherein said second Intranet comprises a second authentication server that uses said connection permission certification to judge whether or not to permit use of services by said remote access terminal.

4. The network system using a firewall dynamic control method according to claim 1, wherein said first Intranet comprises a web server for providing a remote service execution environment to said remote access terminal.

5. The network system using a firewall dynamic control method according to claim 1, wherein said second object directory server comprises a second local site reference section that judges services provided in said second Intranet according to requests from said second dynamic proxy server.

6. The network system using a firewall dynamic control method according to claim 1, characterized in that said first Intranet and second Intranet are connected via a Virtual Private Network.

7. The network system using a firewall dynamic control method according to claim 1, characterized in that communication between said remote access terminal and said service proxy is performed according to Remote Object Protocol.

8. The network system using a firewall dynamic control method according to claim 1, characterized in that communication between said service proxy and said second Intranet is performed according to Remote Object Protocol.

9. A network system using a firewall dynamic control method, comprising:
   a first Intranet and a second Intranet connected to each other with the internet as a base;
   a first dynamic proxy server for forming a firewall to protect said first Intranet;
   a second dynamic proxy server for forming a firewall to protect said second Intranet;
   a remote access terminal connected to said first Intranet:
   a first object directory server provided within said first Intranet for judging whether a service requested by said remote access terminal is provided in said first Intranet or is provided in said second Intranet; and
   a second object directory server provided within said second Intranet to dynamically install a service proxy in said second dynamic proxy server when said service is provided in said second Intranet;
   wherein said second object directory server comprises a means for sending remote service interfaces for accessing said service proxies from a remote site to said second dynamic proxy server.

10. The network system using a firewall dynamic control method according to claim 9, wherein said second dynamic proxy server comprises a means of providing said remote service interfaces to said remote access terminal according to requests from said remote access terminal.

11. The network system using a firewall dynamic control method according to claim 10, characterized in that said service proxy receives provision of said services from said second Intranet according to requests from said remote service interface executed by said remote access terminal.

12. The network system using a firewall dynamic control method according to claim 11, characterized in that said remote access terminal receives provision of said services from said service proxy by executing said remote service interface.

13. The network system using a firewall dynamic control method according to claim 9, wherein said first Intranet comprises a first authentication server that judges whether access from said remote access terminal is approved or not, and when access is approved, issues a connection permission certification.

14. The network system using a firewall dynamic control method according to claim 13, wherein said second Intranet comprises a second authentication server that uses said connection permission certification to judge whether or not to permit use of services by said remote access terminal.

15. The network system using a firewall dynamic control method according to claim 9, wherein said first Intranet comprises a web server for providing a remote service execution environment to said remote access terminal.

16. The network system using a firewall dynamic control method according to claim 9, characterized in that said first Intranet and second Intranet are connected via a Virtual Private Network.

17. The network system using a firewall dynamic control method according to claim 9, characterized in that communication between said remote access terminal and said service proxy is performed according to Remote Object Protocol.

18. The network system using a firewall dynamic control method according to claim 9, characterized in that communication between said service proxy and said second Intranet is performed according to Remote Object Protocol.

19. A network system using a firewall dynamic control method, comprising:
- a first Intranet and a second Intranet connected to each other with the internet as a base;
- a first dynamic proxy server for forming a firewall to protect said first Intranet;
- a second dynamic proxy server for forming a firewall to protect said second Intranet;
- a remote access terminal connected to said first Intranet:
- a first object directory server provided within said first Intranet for judging whether a service requested by said remote access terminal is provided in said first Intranet or is provided in said second Intranet; and
- a second object directory server provided within said second Intranet to dynamically install a service proxy in said second dynamic proxy server when said service is provided in said second Intranet;
- wherein a call back proxy for performing call back to said remote access terminal from said second Intranet is dynamically installed in said first dynamic proxy server by said second Intranet, and
- wherein said second dynamic proxy server comprises a means for simultaneously sending a remote service interface for accessing said service proxy from remote sites and said call back proxy to said first dynamic proxy server.

20. The network system using a firewall dynamic control method according to claim 19, wherein said first Intranet comprises a first authentication server that judges whether access from said remote access terminal is approved or not, and when access is approved, issues a connection permission certification.

21. The network system using a firewall dynamic control method according to claim 20, wherein said second Intranet comprises a second authentication server that uses said connection permission certification to judge whether or not to permit use of services by said remote access terminal.

22. The network system using a firewall dynamic control method according to claim 19, wherein said first Intranet comprises a web server for providing a remote service execution environment to said remote access terminal.

23. The network system using a firewall dynamic control method according to claim 19, characterized in that said first Intranet and second Intranet are connected via a Virtual Private Network.

24. The network system using a firewall dynamic control method according to claim 19, characterized in that communication between said remote access terminal and said service proxy is performed according to Remote Object Protocol.

25. The network system using a firewall dynamic control method according to claim 19, characterized in that communication between said service proxy and said second Intranet is performed according to Remote Object Protocol.

* * * * *